United States Patent Office 2,995,262
Patented Aug. 8, 1961

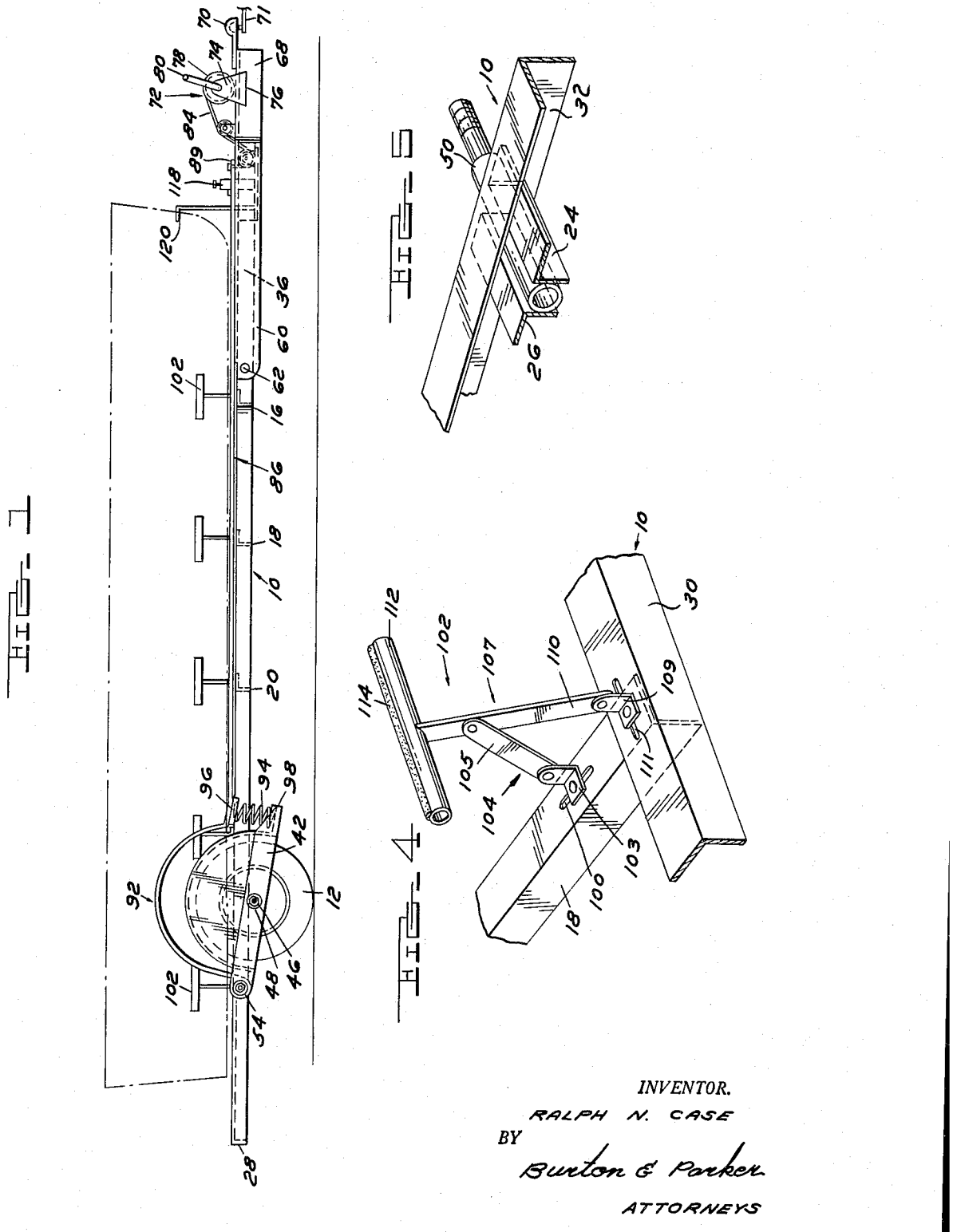

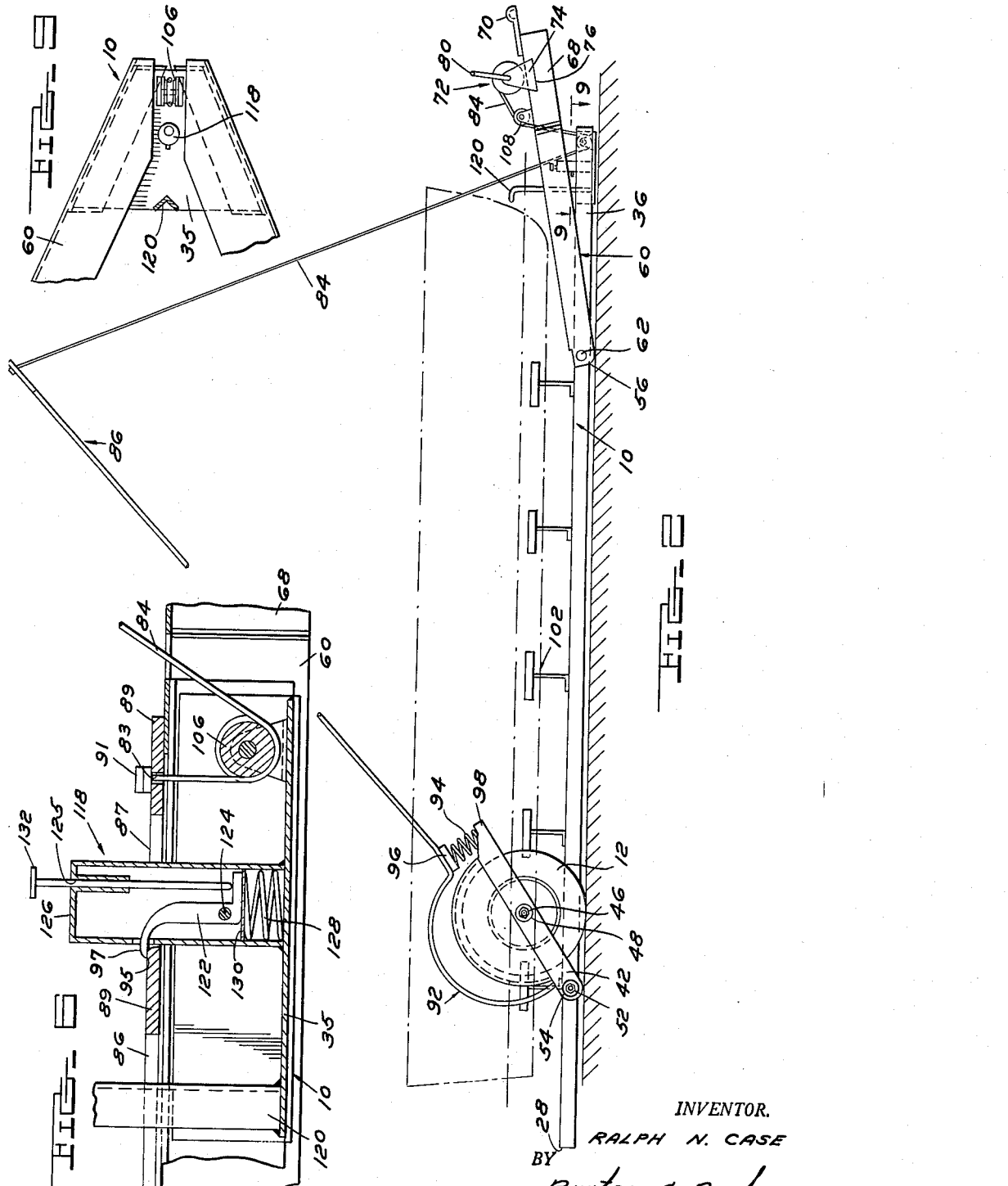

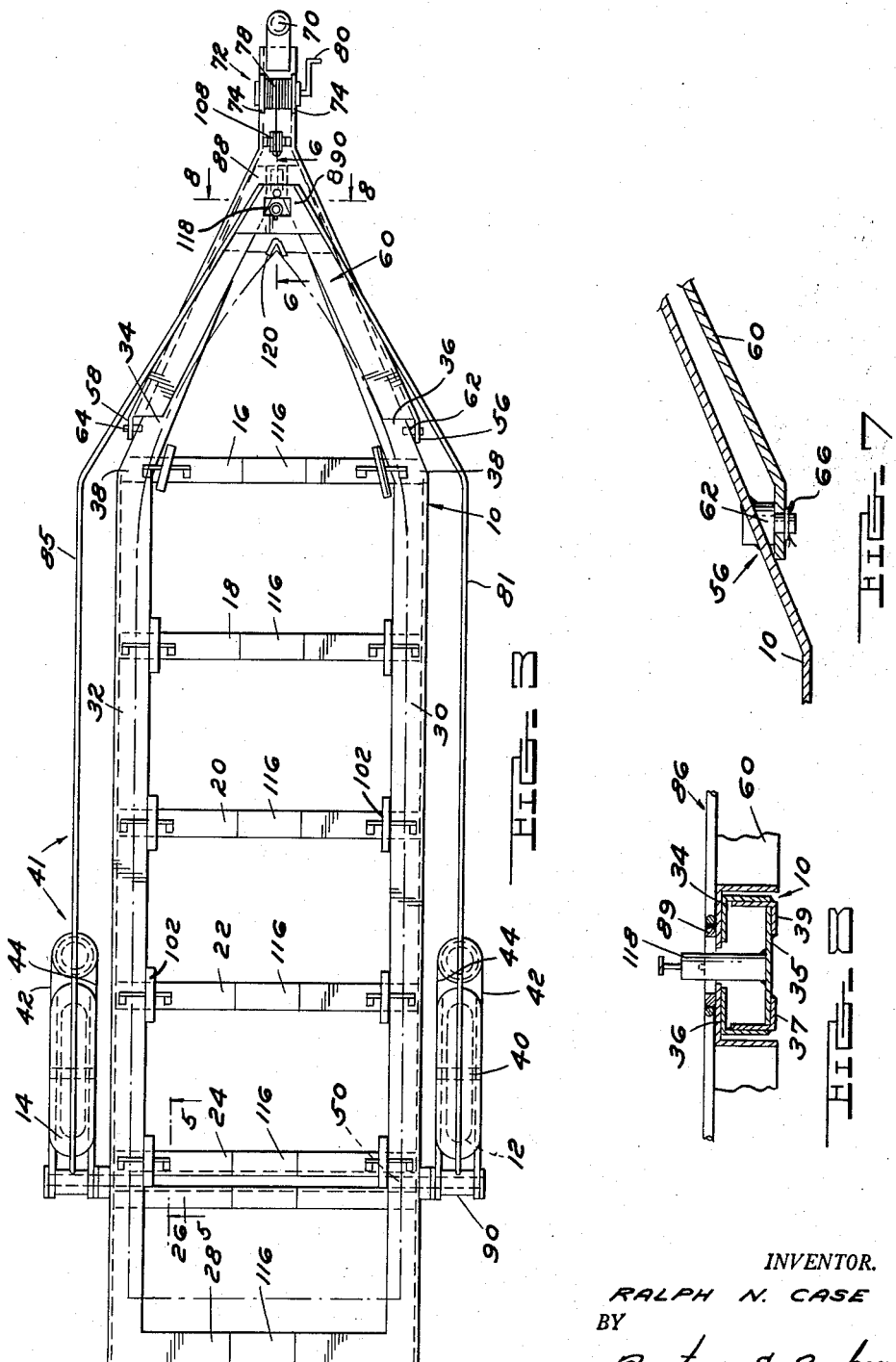

2,995,262
BOAT TRAILER
Ralph N. Case, 21395 Inkster Road, Detroit, Mich., assignor of one-half to Francis T. Dumas, Farmington, Mich.
Filed Oct. 6, 1958, Ser. No. 765,580
3 Claims. (Cl. 214—512)

This invention relates to trailers to be drawn by automotive vehicles and particularly to an improved two-wheeled boat trailer.

An object of the invention is the provision of a trailer which will not only properly support a boat thereupon for transport behind an automotive vehicle, but will also permit ready launching of the boat carried by the trailer in but a few inches of water or the loading of the boat onto the trailer.

I accomplish the aforementioned object by providing in the trailer a vertically shiftable boat-supporting frame which may be lowered relative to the road wheels so that the frame may be rested on the bottom of the body of water in which the boat is to be launched or from which it is to be loaded on the trailer.

A meritorious feature is the provision of a suspension system for the boat-supporting frame which system supports the frame upon a road wheel at each side of the frame with the system including resilient lever arm means having the dual role of functioning as the spring system for the boat trailer and functioning as a lever for causing vertical movement of the boat-supporting frame during launching and loading. As hereinafter disclosed, such lever arm means includes a generally V- or U-shaped yoke.

Another meritorious feature of my trailer is the provision of actuating means causing the aforementioned yoke to elevate the boat-supporting frame and causing the tongue assembly, by which the trailer is coupled to an automotive vehicle, and frame to be pulled into alignment.

Still another meritorious feature of my invention is the provision of locking means for rigidly securing together the boat-supporting frame, the yoke and the tongue assembly for the purpose of supporting a boat thereupon for transport behind an automotive vehicle.

Other objects, advantages, and meritorious features will more fully appear from the specification, claims, and accompanying drawings, wherein:

FIG. 1 is a side view of a trailer embodying my invention showing in phantom outline a boat loaded thereupon for transport behind an automotive vehicle;

FIG. 2 is a side view of a trailer embodying my invention showing a boat disposed in a position to facilitate launching or loading, for example, in but a few inches of water;

FIG. 3 is a top view of a trailer embodying my invention showing in phantom outline a boat loaded thereupon for transport behind an automotive vehicle;

FIG. 4 is a perspective view showing the means mounted atop the frame to position and support the boat thereon;

FIG. 5 is a perspective view of the axle, supporting cross members, and frame taken along line 5—5 of FIG. 3;

FIG. 6 is a detailed side view taken along line 6—6 of FIG. 3;

FIG. 7 is a top view of the pivotal connection between the boat-supporting frame and the tongue assembly;

FIG. 8 is a front view taken along line 8—8 of FIG. 3; and

FIG. 9 is a top view of the forward end of the boat-supporting frame taken along line 9—9 of FIG. 2.

The invention, in substance, includes a load-carrying frame, generally indicated as 10, with wheels at each side, a frame-supporting means 41 pivotally connected to the frame and including wheel axles 40 and a resilient lever arm means. The resilient lever arm means comprising a part of the frame-supporting mechanism and having its free end connected to an actuating device, is capable of swingable motion to cause vertical movement of the load-carrying frame. Locking means is provided to releasably secure the frame-supporting mechanism and pivotal tongue assembly to the load-carrying frame for periods of road travel.

My invention is shown in an exemplary embodiment in FIGS. 1, 2, and 3 of the drawings. More specifically, my invention includes a load-carrying wheeled frame generally indicated at 10 and provided with a pair of road wheels 12 and 14, one at each side of the trailer. The boat-supporting frame is shown in the drawings as constructed of metal channels and includes a main rectangular frame section having frame members 16, 18, 20, 22, 24, 26, and 28 held in spaced-apart relation and suitably secured to the longer frame members designated as 30 and 32. Forwardly extending frame members 34 and 36 may be welded as at 38 to the rectangular section and are rigidly secured at their forward end by means of a plate 35 mounted on inverted channel members 37 and 39 which are welded or securely bolted to frame members 34 and 36. This is most clearly shown in FIG. 8.

The wheels 12 and 14 themselves are not directly connected to the frame generally indicated as 10. Each wheel is supported by box-like wheel-supporting means including supporting members 42 and 44, one on each side of the wheel and between which the wheel axle 40 extends and is secured. The wheel axle 40 is secured to the supporting members by a suitable nut 46 and washer 48 arrangement. Each box-like wheel-supporting means is pivotally connected at one end to the frame 10 by means of an axle or pivot shaft 50 which is rigidly secured to said frame between frame members 24 and 26. The box-like structure formed by the wheel-supporting means 42 and 44 is held in place on axle 50 by a nut 52 and washer 54.

Pivotally connected as at 56 and 58 to the frame is a tongue assembly 60, constructed of metal channels, capable of pivoting relative to the frame as the frame drops toward the ground. The tongue assembly is connected to studs 62 and 64 and held thereon by a pin 66 extending through said studs. The studs may be welded or secured to frame 10 in any suitable fashion.

An extending U-shaped channel welded onto the tongue assembly forms the tongue 68 for the trailer. As shown in FIG. 1, a trailer hitch 70 mounted at the forward end of the tongue serves to couple the trailer to a suitable engaging device 71 mounted on an automotive vehicle. Also mounted on the tongue 68 is a conventional winching device 72 and a pulley 108. Such a winching device may include two upstanding plates 74, see FIGS. 1 and 3, securely fastened to the tongue, as at 76, with a winch drum 78 mounted at the top and between said plates. A suitable cranking arm 80 is provided for manipulation of the winch. A cable 84 wound on the winch and threaded through pulleys 108 and 106 and through an aperture 83 of plate 89 is connected by a suitable device 91 at the end of the cable to the forward meeting end of yoke 86.

The generally V-shaped yoke 86 formed of spring-like material is clearly shown in FIGS. 1, 2, and 3. The yoke may be formed of resilient tubular material. Referring to FIG. 3, note that the yoke is composed of two members 81 and 85 connected together at their forward ends by a plate 89, and extending rearwardly and parallel to the frame and connected thereto by means of a sleeve 90 mounted on axle 50. The sleeve 90 also serves as a spacer for the ends of supporting members 42 and 44. One may picture each member 81 and 85 as being, in side elevation, of inverted dipper configuration. In plan view, see FIG. 3, the yoke members converge at their forward ends to conform with the general outline of the frame structure. The rear portions generally indicated as 92 of the yoke are constructed so as to conform with the curvature of road wheels 12 and 14. The yoke is resiliently connected to box-like wheel-supporting means at the forward end thereof by coil springs 94 or the like. It should be evident that the construction of the yoke, see FIGS. 1 and 2, provide substantial leverage for vertical movement of the frame and at the same time, because of a sufficient degree of flexibility permitting upward deflection, the yoke in conjunction with coil spring 94 constitutes the trailer's spring system during periods of road travel. The upward deflection is indicated by arrows numbered 97. The upward end of coil spring 94 is connected to the yoke by means of a suitable holder 96 secured to the yoke. A pad is disposed between the point of contact of the holder and spring. A suitable holder 98 connects the lower end of the coil spring with the wheel-supporting means 42 and 44 and also serves as a spacer for said wheel-supporting means. A pad is placed at the point of contact between the holder and spring.

Mounted atop the frame and cross members are means to position and support the boat. Such means include a plurality of pairs of adjustable cradling bunks, generally indicated as 102, disposed at opposite sides of the frame. As shown in FIG. 4, a slot 100 in the cross member 18, perpendicular to frame member 30, will permit vertical movement of the cradling bunk by allowing adjustment of bracket 104 which is bolted to the cross member. Bracket 104 provides sufficient vertical movement of the cradling bunk to conform with the hull of the boat and consists of two components, 103 and 105, riveted or bolted together securely. Component 105 is pivotally connected to bracket 107. Bracket 107 is capable of horizontal adjustment as provided for by a slot 111 in 30 and 18 perpendicular to the frame member 18. Bracket 107 is also composed of two parts, 109 and 110, and is capable of sufficient horizontal movement to adjust the cradling bunk to the curvature of the boat's hull. Welded to the end of support 110 is a tubular member 112, having suitable cushioned padding 114 on the upper and inner sides, against which the boat is positioned. Further means for positioning and supporting the boat is provided for by suitable cushioned padding 116 fastened midway between the cross members of the frame along the center line on which the keel of the boat rests.

A plate 35 is disposed between frame members 34 and 36 on which is mounted a pulley 106, a locking device 118, and a device 120 for positioning the bow of the boat. The pulley 106 is suitably secured to the plate and functions as a part of the trailer's actuating means. The locking device, see FIG. 6, may include a hook 122 pivotally mounted on a pin 124 secured to the walls of the cylindrical container 126, a coil spring 128, and a vertically movable plate 130 atop said spring and abutting the base of the hook. A push rod 132, extending through an aperture 125 in the top of the cylinder 126 and in contact with the base of the hook, provides a means for depressing the coil spring and thereby disengaging the hooking device from plate 89. A rectangular opening 87 in plate 89 is provided to receive the locking device. Due to the pivotal mounting and the tension on the hook by the coil spring, the hook is capable of automatically locking in place. To accomplish this, the plate 89 is provided with a bevel 95 and the hook is provided with a beveled surface 97 whereby, upon contact of such surfaces as plate 89 approaches the position shown in FIG. 6, the hook will automatically lock thereover in an obvious fashion.

The following is a summary of the operation of the trailer. Let us assume that the trailer is supporting a boat and is connected to an automotive vehicle. Because the trailer is capable of launching a boat in shallow water, it is possible to back the entire trailer into the water. By applying downward pressure to the push rod, the locking device disengages from plate 89. The boat-supporting frame will automatically descend by its own weight until in contact with the bottom of the body of water. While the frame is lowering, the hull of the boat comes in contact with the water and consequently shifts the support of the boat from the frame to the water. The boat can then be removed from the position above the trailer by floating in a rearward direction. To load the boat, one first positions it above the frame as shown in FIG. 2. It should be evident from FIG. 2 that by winding the winch, the yoke is pulled downward and the leverage provided by the yoke will cause the frame to elevate. The winding of the winch is continued until the boat is entirely supported by the frame and at which time the frame, yoke, and tongue assembly will be aligned, see FIG. 6, and upon contact with the locking device, the yoke, tongue assembly, and frame will automatically be locked securely in place for road travel.

What I claim is:

1. A load-carrying wheeled road vehicle, comprising, in combination: a load-carrying frame; a pair of road wheels, one at each side of the frame; frame-supporting mechanism including an axle for each wheel; said mechanism pivotally connected to the frame at a point spaced longitudinally therealong from the wheel axle; said mechanism including lever arm means extending longitudinally forwardly along the frame and swingable above the frame to pivot said mechanism about its pivotal connection with the frame and fulcruming about the wheel axle to raise and lower the frame relative to the wheels, a tongue pivotally connected to the frame and swingable between a position extending angularly upwardly from the frame and a position juxtaposing and in alignment with the frame, said tongue having a portion underlying the lever arm means, a winch mounted on the tongue, a pulley mounted on the frame, and a line connected to the winch and extending downwardly around the pulley and upwardly to the lever arm whereby upon winding in the line the lever arm frame and tongue are pulled into aligned juxtaposition.

2. A boat trailer comprising, in combination: a boat-carrying frame having forward and rear ends; a pair of road wheels, one at each side of the frame; frame-supporting mechanism at each side of the frame and including an axle for each wheel; said mechanism, at each side of the frame, including a wheel-receiving and supporting frame assembly within which the wheel is disposed and to which the wheel axle is secured; means pivotally connecting one end of each wheel-receiving and supporting frame assembly to the boat-carrying frame rearwardly of the wheel axle; a pair of lever arms, one secured to each frame assembly and extending longitudinally along the boat-carrying frame toward the forward end thereof and swingable vertically about the boat-carrying frame to pivot the frame assemblies about their pivotal connections with the boat-carrying frame and fulcruming such assemblies upon the wheel axles to raise and lower the boat-carrying frame; means on the boat-carrying frame for supporting a boat thereon; a tongue pivotally secured to the boat-carrying frame at the forward end thereof and vertically swingable above the frame; a portion of the boat-carrying frame extending forwardly beneath the tongue to limit the down swing of the tongue; a winch mounted on the tongue; a pulley mounted on the frame; a line connected at one end to the winch and carried beneath said pulley and connected to the lever arms whereby upon winding the line upon the winch the frame, tongue, and lever arms are pulled into juxtaposition; and locking means mounted on said portion of the frame adjacent the tongue for securing the tongue, lever arms, and frame rigidly together for road travel of the trailer.

3. The invention as defined in claim 2 characterized in that the free ends of the lever arms are secured together, and the lever arms are pivotally connected to the wheel-receiving and supporting frame assemblies at the same point that such assemblies are pivotally connected to the boat-carrying frame, and spring means are interposed between the lever arms and the wheel-receiving and supporting frame assemblies forwardly of the wheel axles.

References Cited in the file of this patent

UNITED STATES PATENTS

| | | |
|---|---|---|
| 2,452,267 | Schramm | Oct. 26, 1948 |
| 2,610,865 | Cantrell | Sept. 16, 1952 |
| 2,650,730 | Rohm | Sept. 1, 1953 |
| 2,711,259 | Jones | June 21, 1955 |
| 2,740,543 | Mounsdon et al. | Apr. 3, 1956 |
| 2,806,710 | Mascaro | Sept. 17, 1957 |